United States Patent Office 3,502,002
Patented Mar. 24, 1970

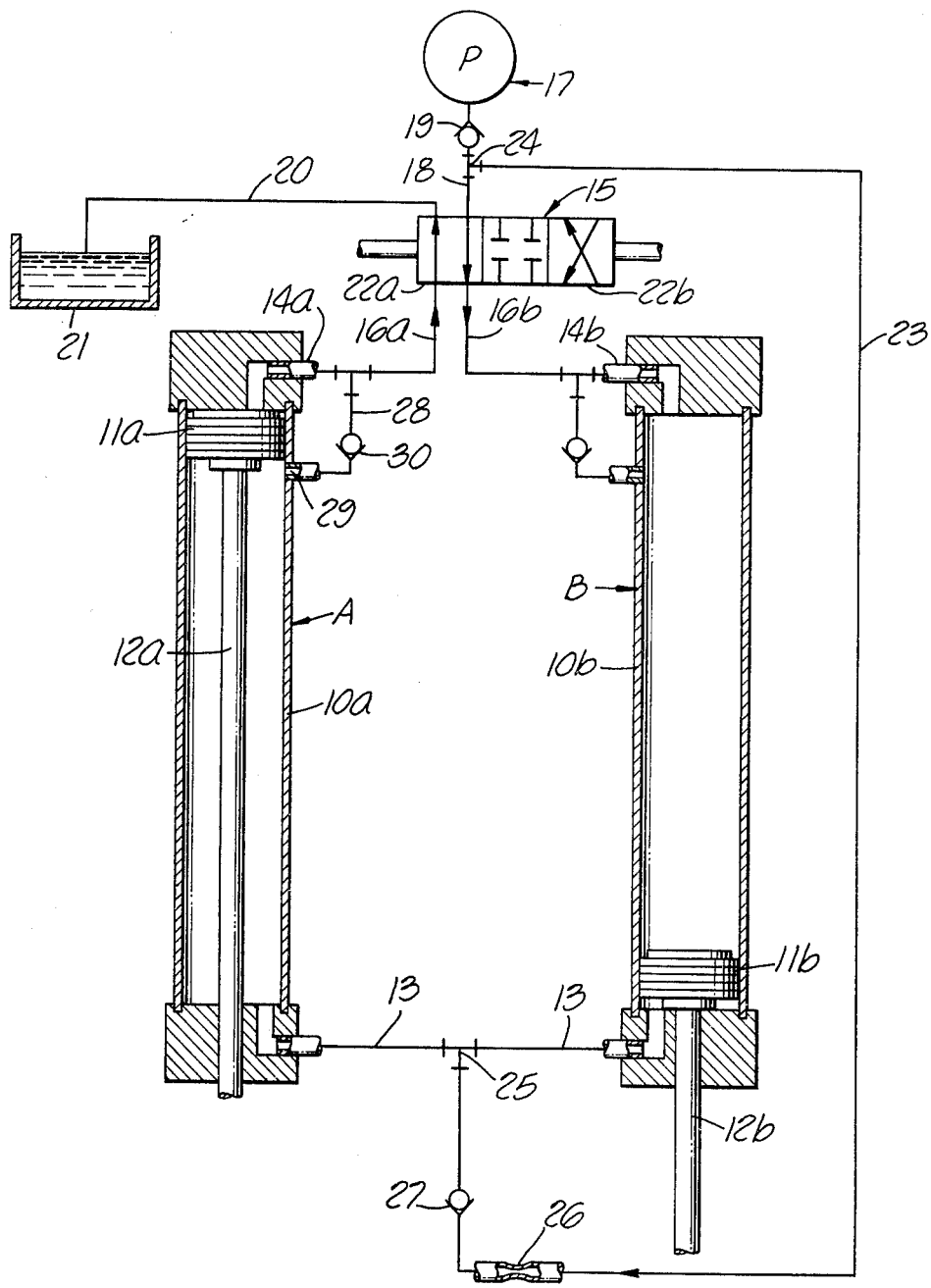

3,502,002
MEANS FOR SYNCHRONIZING A PAIR OF HYDRAULIC POWER CYLINDER ACTUATORS
Marvin E. Whiteman, Jr., Northridge, Calif., assignor to Whiteman Manufacturing Company, Pacoima, Calif., a corporation of California
Filed Apr. 2, 1968, Ser. No. 718,098
Int. Cl. F01l 15/12; F15b 15/22, 7/10
U.S. Cl. 91—178                                  8 Claims

ABSTRACT OF THE DISCLOSURE

Means for synchronizing a pair of hydraulic power cylinder actuators and mutually slaving the operation of one to the other when it acts as the master, the cylinder of each actuator having a piston power delivery element therein. The cylinders of the actuators are connected for series operation by a flow connection between one set of the cylinder ends, while the other set of cylinder ends, are respectively provided with an inlet-outlet connection for the admission of fluid when the actuator operates as the master, and exhaust of fluid when it operates as a slave unit. Motion of the master piston is transmitted hydraulically through a make-up fluid which fills the space of the flow connection and connected cylinder portions, a venting one-way by-pass being provided at the inlet-outlet connection ends of the cylinders, controlled by the piston so as to open and permit replenishment flow of make-up fluid to compensate for leakage and assure complete filling of the make-up fluid space so that the slave piston will always have a full stroke and be synchronized with the operation of the piston movement of the actuator which is functioning as the master unit.

BACKGROUND OF THE INVENTION

The invention pertains to hydraulic power actuators and their control.

In many applications of power cylinders, it is desirable to connect a pair of power cylinder actuators so that the power delivery element of one will be synchronized at all times with the movement of the power delivery element of the other actuator, and that the movements of the power delivery elements shall at all times be full and complete.

Heretofore, various types of mechanical mechanisms have been utilized to interlock the movements of the reciprocable power delivery elements of a pair of hydraulic actuators in such a manner that as one is extended, the other will be retracted, and vice versa. An examplary arrangement such as this is illustrated in United States Letters Patent No. 3,327,634 covering Concrete Pumping Apparatus, wherein the pistons of a pair of oppositely operating power delivery actuators are alternately energized to drive reciprocable connected pistons of a dual cement pumping unit. In the patented arrangement, the power delivery elements are respectively provided with elongate racks having confronting teeth meshing with the teeth at the opposite sides of a large common idler gear. Thus, as the piston of one of the actuators moves in one direction, the piston of the other actuator will move in an opposite direction.

Mechanical arrangements of the foregoing type have in the main been quite costly, require a relatively large operating space, and are subject to the usual undesirable operating characteristics inherent in mechanisms having mechanically moving parts. For example, piston rods have been broken due to pressure build up, undesirable shock forces have resulted from particles becoming lodged in the teeth of the gear or rack, and other characteristics and results which as a practical matter make it desirable to improve the existing mechanical arrangements.

In an endeavor to find a solution to the problem, attempts have been made to provide suitable hydraulic means which could operate on oil or other fluids, and which could be utilized instead of the mechanical interconnections such as gears, levers and etc., for mutually synchronizing and slaving the piston operation of one power actuator to the piston operation of another actuator when it is operated as the master actuator. These attempts, prior to the present invention, have been unsuccessful and fail to produce the desired operation, primarily due to fluid leakage which would change the stroke travel of the slave piston and the consequent synchronization of the actuator units. The present invention solves the above noted problems and difficulties in a unique manner as will subsequently be explained in detail.

SUMMARY OF THE INVENTION

The present invention relates generally to hydraulic power actuators, and is more particularly concerned with means for synchronizing a pair of hydraulic power cylinder actuators so that their power delivery elements will operate in unvarying timed relation.

In its broad concept the present invention seeks to provide improved means, susceptible of general application, for hydraulically interconnecting a pair of fluid power cylinder actuators in a manner such that mutual slaving of the operation of one will be obtained with respect to the operation of the other.

The accomplishment of the above purpose is in the main made possible by the utilization of a control in which make-up fluid is continuously added to compensate for leakage, whereby to thus obtain and maintain full stroke operation of the slave piston.

A further object of the herein described invention is provided synchronizing means which are reliable in operation, which occupies relatively small space, which embodies a small number of parts, which can be easily maintained; and which will operate efficiently over long periods of use.

Another object is to provide hydraulic synchronizing means which include unique means for reestablishing and maintaining the volume of fluid between the pistons of the actuators so as to always completely fill the space required to assure full and complete stroke movement of the slave piston.

A still further object of the invention is to provide in hydraulic synchronizing means of the above mentioned character, a novel by-pass vent for the make-up fluid, which is under control of the piston of the actuator unit, and which will provide a built-in leakage and operate to maintain the piston strokes synchronized for full and complete movement at all times.

Still another object is to provide a synchronizing mechanism for a pair of fluid actuated cylinder-piston power actuator in which the cylinders are connected at one set of their ends by a flow connection which permits flow of a motion transmitting fluid between the respective cylinders during the operation of one actuator as a master and the other actuator as a slave unit.

The foregoing and other objects, features and advantages of the invention will be presented in the following part of the specification, wherein detailed description is for the purpose of fully disclosing the invention without placing limitations thereon.

BRIEF DESCRIPTION OF THE DRAWINGS

Referring to the accompanying drawings, the single figure diagrammatically illustrates the synchronizing means of the present invention, and further includes a schematic of the control instrumentalities.

DESCRIPTION OF THE PREFERRED EMBODIMENTS

Referring more specifically to the drawings, the present invention for illustrative purposes has been shown diagrammatically as being applied to a pair of hydraulic actuators as generally indicated at A and B. The actuators respectively comprise a cylinder 10a and cylinder 10b, these cylinders being operatively associated with a piston 11a connected with a power delivery rod 12a, and a piston 11b connected with a power delivery rod 12b. As thus far explained, the actuator units are of conventional construction.

According to the present invention, it is desired to operate the hydraulic actuator units in synchronism and in such manner that the power delivery rod of one of the units will be in retracted position when the other is in extended position, and vice versa. That is to say, so that the pistons will be reciprocated in alternate reverse directions. As a further feature of the invention, it is desirable to be able to utilize the hydraulic actuators for alternately operating a pair of devices, for example, a pair of pumping elements as disclosed in the previously mentioned U.S. Letters Patent No. 3,327,634 where the actuators are utilized for driving a pair of concrete pumps. In applications of this character the operation of the actuators should unerringly be maintained in synchronism, and the pistons should operate with complete full strokes at all times. In the prior art devices, the desired operation was obtained by the utilization of a series of levers, rack elements having tooth engagement with a common gear, as well as other mechanical adaptions. It is a main feature according to the present invention to provide a hydraulic synchronizing means in order to overcome the inherent disadvantages of mechanical mechanisms, when operating over long periods of time.

For such purpose, the cylinders of the actuators are connected at one set of their ends by means of a cross connection 13 which provides a flow channel for the interchange of a motion transmitting fluid contained in the cross connection 13 and the connected portions of the cylinders extending between the pistons 11a and 11b.

At the other set of ends of the cylinders, each cylinder is provided with an inlet-outlet fitting as indicated by the numerals 14a and 14b respectively, so that a pressurized fluid may be applied to one of the cylinders while exhausting fluid from the other cylinder.

For controlling the operation of the actuators so as to operate one of the actuators on a power delivering stroke, while simultaneously returning the other actuator from a power delivery stroke, a main control valve 15 of conventional construction is provided. This valve is arranged to be shifted by appropriate mechanism to positions wherein pressure will be alternately applied to the actuators, and when pressurized fluid is being supplied to one of the actuator cylinders, the other cylinder will be exhausting. Appropriate conduits 16a and 16b provide flow connections from the main valve to the respective fittings 14a and 14b.

There is provided a suitable source of fluid pressure supply 17 which may consist of a suitable pump P, and which has an outlet connected with the valve 15 through a conduit 18 containing a suitable check valve 19 of conventional construction for preventing reverse flow to the pump. Also connected with the valve 15 is a conduit 20 which leads from the valve to a sump or fluid recovery tank 21.

The valve 15 is arranged to be shifted by conventional power means, and conventional control circuitry as well known in the art to shift the valve so as to selectively place the valve section 22a or section 22b alternately in effective control positions with reference to the conduits 16a and 16b, and thereby interchangeably apply pressure and permit exhaust of the cylinders 10a and 10b.

With the arrangement as thus far described, manipulation of the valve 15 will effect a master and slave operation of the actuator units A and B. For example as shown on the drawing, with valve 15 having its section 22a in the position indicated, the pressure fluid from the pump P will have been conducted into the fitting 14b so as to force the piston 11b to its power stroke limit of travel. During this movement of the piston 11b, the fluid in the cylinder 10b ahead of the piston 11b will be moved through the cross connection 13 into the cylinder 10a so as to force the piston 11a therein towards the limit of its retracting stroke as shown. The piston 11b during this movement constitutes the master element while the piston 11a functions as a slave element. By now moving the valve 15 to the left so as to position the valve section 22b into its operative position, fluid pressure will then be applied to the fitting 14a, while permitting exhaust from the fitting 14b of cylinder 10b. The operation of the pistons of the actuators is now reversed so that piston 11a becomes the master element and piston 11b the slave element.

From the foregoing description, it will be realized that the hydraulic actuators A and B are basically synchronized and will alternately operate as master and slave units. However, due to leakage, oil build up and other factors, conditions can arise which will prevent the slave unit from completing a full stroke, and thus impairing the synchronization of the actuators. It will be appreciated that this leakage reduces the amount of fluid within the cylinder portions between the pistons, and which is interchanged through the cross connection 13 to provide the hydraulic coupling for transmitting the motion of the master piston to the slave piston.

Provision is made to overcome this difficulty by providing a supply of make-up fluid to compensate for the leakage, and further provide a built-in leakage so as to assure that the volume of hydraulic coupling fluid will be maintained so as to completely fill the cylinder and cross connection spaces. As shown in the drawings, a branch conduit 23 is connected at one end as indicated at 24 to a point downstream of the check valve 19 and at its other end is connected at a point indicated at 25 with the cross connection 13. Fluid pressure is supplied through the branch conduit 23, a restriction 26 being positioned in the line to limit the fluid flow to approximately one gallon per minute. A check valve 27, downstream from the restriction 26, opposes reverse flow and confines the flow of fluid between the cylinders via the cross connection 13, yet will permit the addition of make-up fluid when necessary.

In order to assure that the make-up fluid in the cylinders and cross connection are maintained at full volume so as to completely fill the spaces therein, provision is made for venting each cylinder to the fitting 14a or 14b, as the case may be, when the piston reaches the full limit of its retraction stroke. This position is shown for the piston 11a in the cylinder 10a. At this position of the piston, it will be seen that a by-pass conduit 28 has its inlet connected with the cylinder interior through a port opening 29 which is adjacent the inner face of the piston when it is at the limit of its travel. The interior of the cylinder is thus vented to the fitting 14a which is now connected with the exhaust line. A check valve 30 permits venting flow, but closes to oppose back flow through the by-pass. It will be observed that the port 29 is controlled by the position of the piston 11a, and that the venting operation cannot take place until the piston 11a has reached the limit of its retraction stroke. Further, it will be observed that the by-pass during the venting operation connects the opposite faces of the piston 11a. Moreover, when fluid pressure is applied to the piston 11a to move it in a power stroke direction, this pressure acts upon the check valve 30 and maintains it closed until such time as the piston has moved past the port opening 29, whereupon equal pressures are applied to both sides of the check valve and it will make no difference whether it is open or closed. A similar by-pass is provided for the cylinder 10b which operates in the same manner as explained above.

I claim:

1. Synchronized hydraulic power cylinder actuators, comprising:
   (a) a pair of cylinders each having an operatively associated piston therein connected with a power delivery member;
   (b) means connecting said cylinders for series flow operation including a cross-connection between an end of one cylinder and an end of the other cylinder, and an inlet-outlet fluid connection at the other end of each cylinder for supplying a fluid pressure to said cylinder and exhausting fluid from the cylinder;
   (c) and means for supplying independently of the cylinder inlet-outlet fluid connection a make-up fluid pressure between the pistons within the ends of said cylinders having communication with said cross-connection.

2. The invention according to claim 1, wherein the make-up fluid pressure is supplied through a flow path containing a check valve opposing reverse flow therein, said check valve being externally of the cylinders.

3. The invention according to claim 2, wherein the flow path contains a conduit connected to said check valve, said conduit having a reduced diameter portion providing a restricted flow passage upstream from said check valve.

4. The invention according to claim 1, including means for venting the cylinder make-up fluid in each cylinder when the piston therein reaches the limit of its travel at said other end.

5. The invention according to claim 4, wherein the venting means comprises a one-way by-pass effective at the limit position of the position to interconnect the opposite sides of said piston.

6. The invention according to claim 5, wherein the by-pass includes a check valve exteriorly of the cylinder operative to oppose reverse flow therein.

7. The invention according to claim 5, wherein the piston operates as valve means for connecting the by-pass inlet with the part of the cylinder having the make-up fluid therein.

8. The invention according to claim 5, wherein the by-pass is externally of said cylinder and has an inlet port positioned to communicate with the cylinder interior at a point adjacent the inner face of the piston in said limit position of travel.

References Cited

UNITED STATES PATENTS

| | | | |
|---|---|---|---|
| 2,261,444 | 11/1941 | Neubert | 91—401 |
| 2,462,580 | 2/1949 | Watson | 91—411 |

FOREIGN PATENTS 18,115  10/1956  Germany.

PAUL E. MASLOUSKY, Primary Examiner

U.S. Cl. X.R.

60—54.5; 91—402